March 10, 1931.  F. A. COARI  1,795,476
NUT PICKING MACHINE
Original Filed Aug. 17, 1923  3 Sheets-Sheet 1
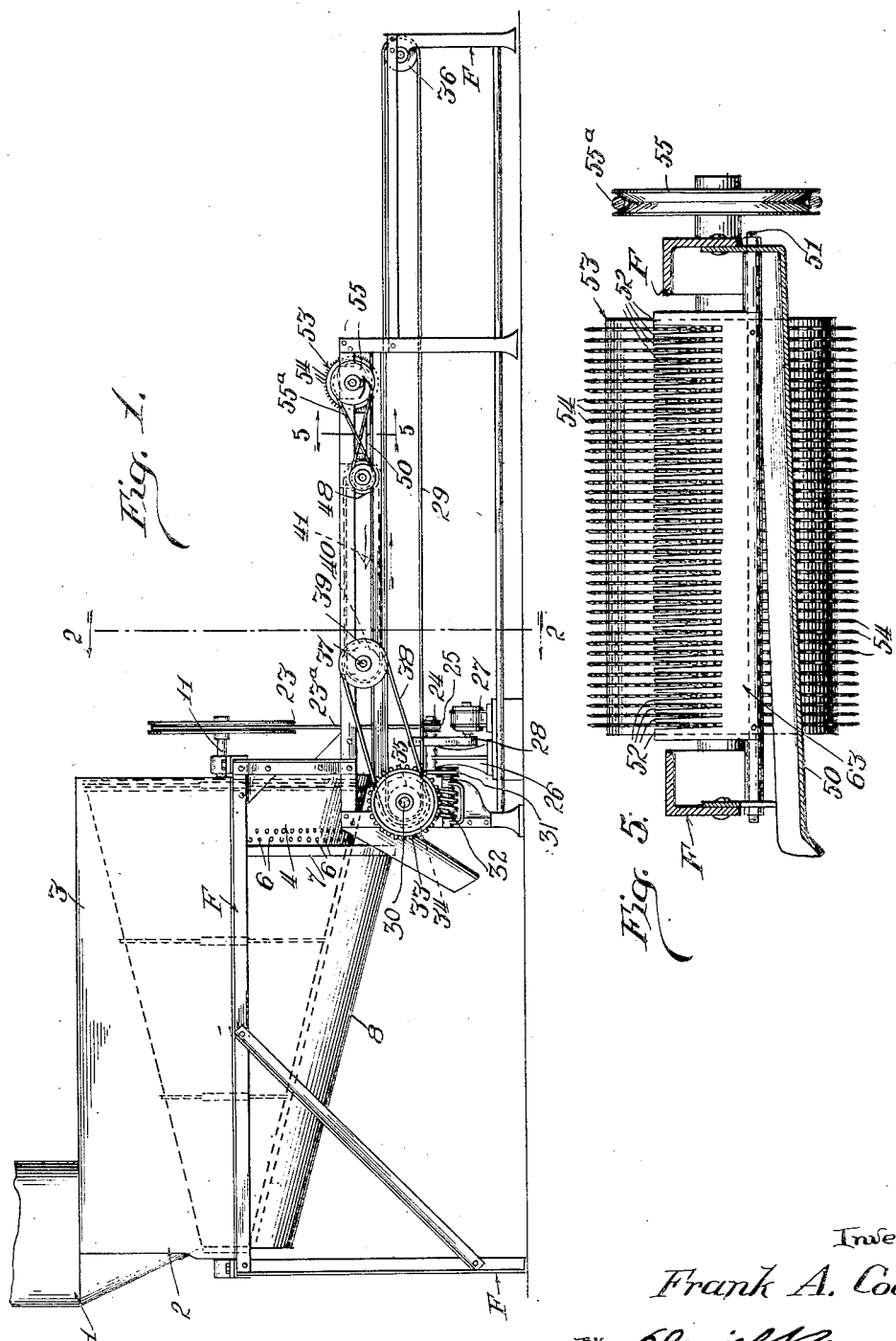
Inventor
Frank A. Coari
By Daniel F Brennan
Attorney.

March 10, 1931.　　　F. A. COARI　　　1,795,476
NUT PICKING MACHINE
Original Filed Aug. 17, 1923　　3 Sheets-Sheet 2
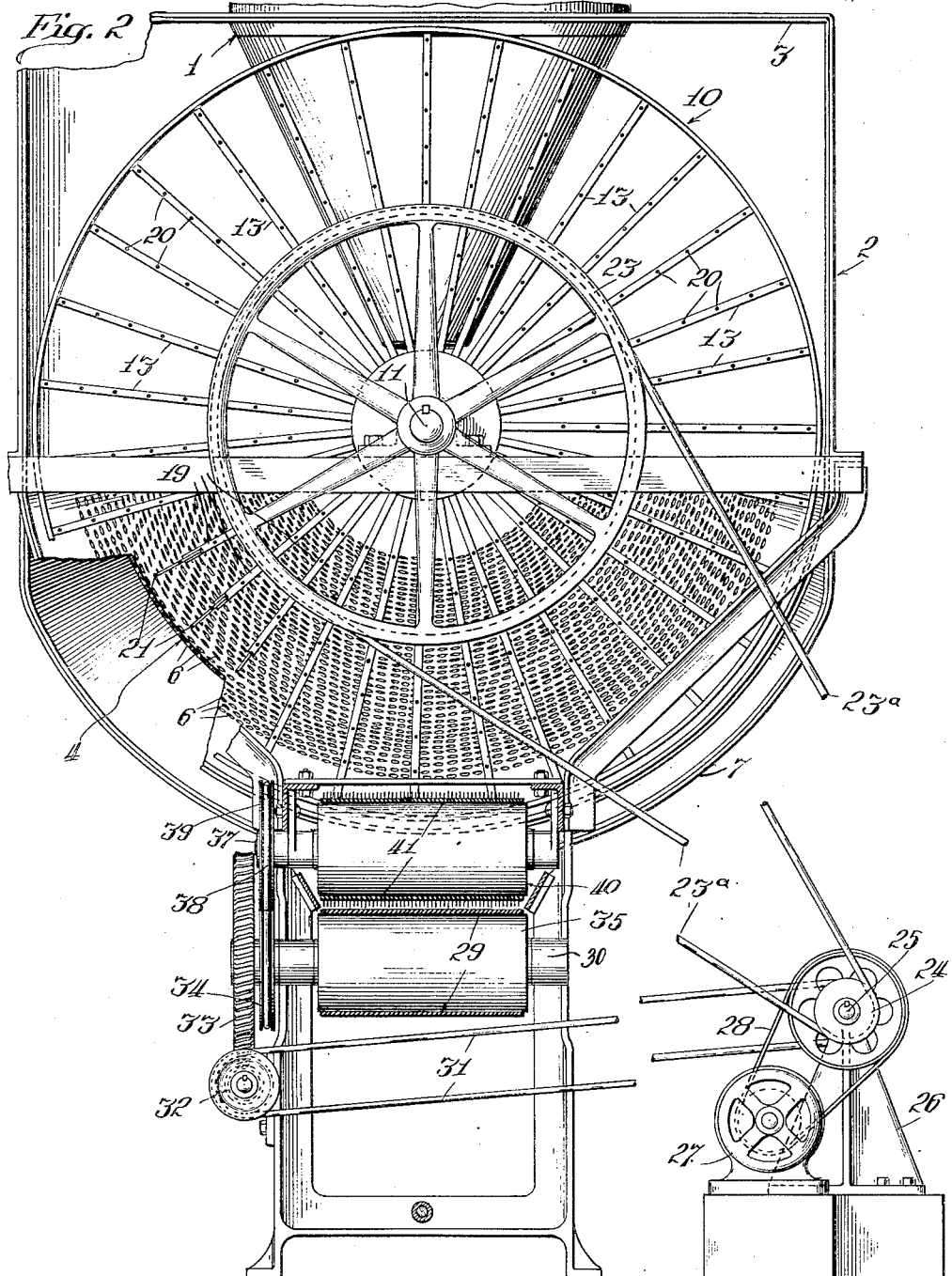
Inventor
Frank A. Coari
By Daniel J. Brennan,
Attorney.

March 10, 1931.  F. A. COARI  1,795,476
NUT PICKING MACHINE
Original Filed Aug. 17, 1923  3 Sheets-Sheet 3
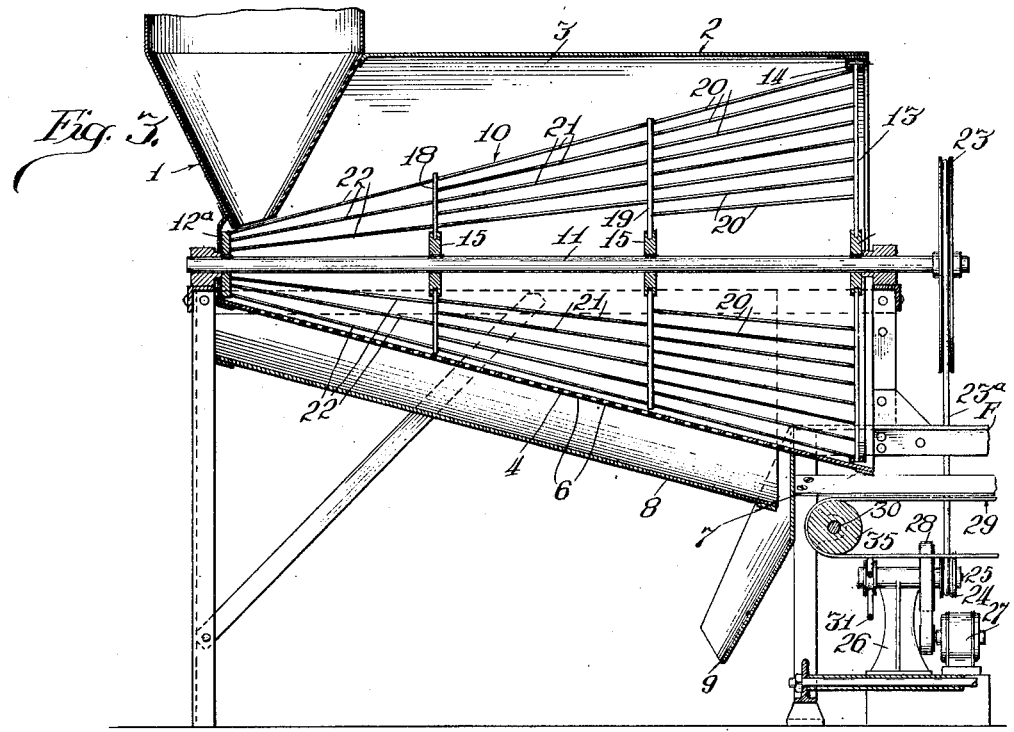
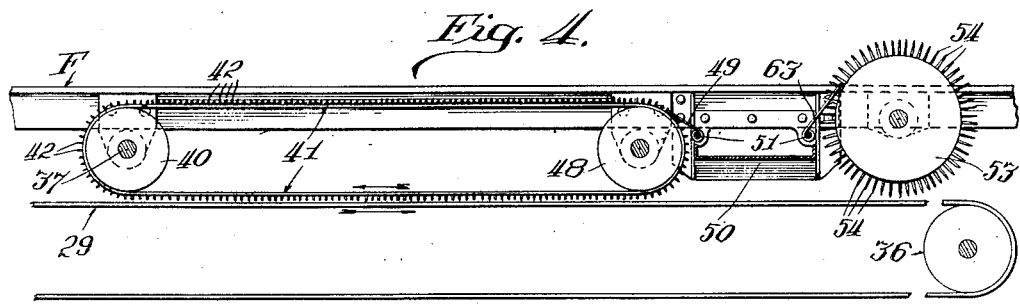
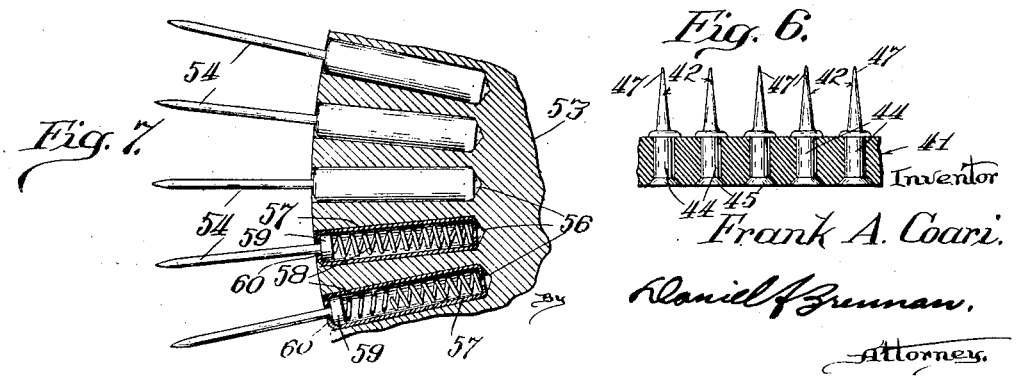
Inventor
Frank A. Coari.
Daniel F Brennan,
Attorney.

Patented Mar. 10, 1931

1,795,476

UNITED STATES PATENT OFFICE

FRANK A. COARI, OF CHICAGO, ILLINOIS

NUT-PICKING MACHINE

Application filed August 17, 1923, Serial No. 657,856. Renewed July 28, 1930.

This invention relates to improvements in nut picking machines.

It is an object of the invention to provide a machine in which cracked nuts, including in a mixture shells and meat, are thoroughly agitated to loosen the mixture and in which this mixture is then subjected to the action of picking means adapted to enter into the soft meat to separate the same from the shells.

It is also an object of the invention to effect this separation of the meat or kernels while the mixture is in movement so as to permit of an uninterrupted continued treatment of the nuts.

It is also an object of the invention to strip the meat from the picking means, so as to separate the same completely from the shells and to deliver the meat at a point remote from that at which the empty shells are delivered.

It is furthermore an object of the invention to provide a machine of this character in which particles—whether meat or shells—exceeding in smallness a predetermined size are automatically eliminated from the mixture so as not to subject these small particles to the treatment by the picking devices.

The invention has furthermore the object of providing novel picking means adapted to enter the soft or meaty parts of the mixture and to convey them to a delivery point.

The invention also has the object of providing a common drive for the agitator through which the mixture is thoroughly stirred to effect the separation of the parts of excessive smallness, and for the picking device proper.

Another object of the invention is to arrange a plurality of picking mechanisms in such manner that they will act successively upon the material presented to them, said several picking devices delivering, however, the picked material to a common chute or point of delivery.

The invention also contemplates the yielding arrangement of picking points with respect to the material, whereby a breakage of these points is effectively prevented without interfering, however, with the removal of the meaty part from the shells.

With these and numerous other objects in view, an embodiment of the invention is described in the appended specification, the novel features being pointed out in the claims.

In the specification, reference has been made to the drawings, in which:

Fig. 1 is a side elevation of the complete machine;

Fig. 2 is a front elevation of the same on a larger scale with certain parts shown in section;

Fig. 3 is a vertical, central, sectional view through the agitating device;

Fig. 4 is partly elevation and partly section of the conveyor and picking device;

Fig. 5 is a detail, sectional view on line 5—5 of Fig. 1 on a larger scale;

Fig. 6 is a detail, sectional view through the picking belt, and

Fig. 7 is a detail, fragmentary, sectional view through the picking drum.

The machine comprises as one of its essential parts an agitating device by means of which a mixture consisting of broken kernels and shells of cracked nuts is thoroughly stirred and in which this mixture is loosened—whereby the subsequent operations necessary for ultimate separation of the meat from the shells is facilitated. In addition to these devices for agitating the mixture and for eliminating from the mixture those particles which are of too small a size to merit further treatment, the machine also includes picking elements for separating the kernels from the broken shells, and means for conveying the picked kernels in a path different from that in which the shells continue their movement.

The mixture of kernels and shells, as it may come from the cracking machine for the nuts, is introduced into the present machine through a hopper 1, which together with the other parts of the machine is supported by the frame F. The frame F also serves for supporting adjacent the lower end of the hoppers, a box shaped structure 2 comprising a substantially square casing 3 at its upper part, while the lower part of this box shaped structure, as may be seen in Figs. 2 and 3, has approximately the shape of half of a truncated cone 4, the smaller end of the cone being secured to the rear end of the frame and casing while the larger end of the cone, reinforced by a suitable circumferential strip 7, lies in the same plane as the front edge of the upper box shaped structure of this casing.

The wall of that part of the stationary casing which is shaped as a truncated cone is provided with a large number of openings 6 of relatively small size, as indicated in Figs. 1 and 3, and the small grained material discharged from the hopper into this cone will therefore drop through these openings so as to be sifted out. The material passing through the openings in the sieve drops onto the second chute or cone 8 similar to the semi-truncated cone 7 described and also extending in the same direction, whereby this small grained material after sifting is finally discharged from a chute 9 into a suitable receptacle, not shown. This discharged material not only includes shell particles of the cracked nuts but also those kernel parts which are too small to be of great commercial value.

Within the interior of the casing 2 formed by the upper and substantially square superstructure 3 and the lower truncated cone portion 4 an agitating device is located. This agitating device, as shown particularly in Figs. 2 and 3, also comprises a conical skeleton structure 10 secured to a shaft 11 which extends longitudinally of the casing and which is rotatably supported in bearings mounted on the frame F of the machine. The skeleton structure 10 of the agitator consists of an end ring 12 and a disc 12ª, the former of which is considerably larger in diameter than the latter, the larger end ring 12 being connected with the shaft 11 through a plurality of spokes 13 mounted on a hub 14 forming a spider. Between the disc 12ª and the hub 14, additional hubs 15 are secured to the shaft and these additional hubs serve for supporting spoke elements 18 and 19 of suitable length, thus forming spiders of different diameters. The spokes 13 are longer than the spokes 19 and the latter again are longer than the spokes 18 which in radial direction exceed the dimension of the disc 12ª. The spiders are connected with each other by a relatively large number of longitudinal bars 20. These bars are approximately uniformly spaced in each of the spiders, and the spokes again are spaced substantially uniformly and circumferentially from each other.

In this way a truncated cage structure is formed, and this cage structure is extended by a similar cage structure formed by connecting bars 21 which extend between the spiders formed by spokes 19 and 18 in a manner similar to the connecting bars 20 between spiders formed by the spokes 15 and 19. Owing to the reduced circumference of the portion of this skeleton structure between the spiders formed by spokes 19 and 18 as compared with the circumference between the spiders formed by spokes 13 and 19, the number of bars 21 is less than the number of the bars 20. The same principle is applied to the bars 22 which extend from the spiders formed by spokes 18 towards the end disc 12ª of this shaker or agitating structure.

The shaft 11 on which this agitator or shaker is mounted extends beyond the bearings of the frame and is provided at its outer end with suitable driving means shown as a grooved pulley 23 over which the belt 23ª is trained. This belt is driven by the pulley 24 of a jack shaft 25 in the bearing bracket 26. The jack shaft 25 receives its drive from a motor 27 through a belt 28, Figs. 1–3. In the practical operation of the machine it has been found advisable to drive the pulley 23 and consequently the shaker at a speed of approximately 100 R. P. M.

The mixture of kernels and shells introduced through the hopper 1 into the casing will be repeatedly shaken up by the bars 20, 21 and 22 of the skeleton structure so as to be thoroughly loosened, to facilitate the separation of the heavier and larger parts from the lighter and smaller ones. All of the particles are thereby retarded in their movement over the inclined wall of the sieve by this action of the agitator so as to prevent the small particles from sliding down this inclined wall onto the conveyor belt, to be described herein later.

The mixture of kernels and shells of useful size thoroughly loosened, drops from the conical casing on to the belt 29 which is trained over a pulley 35 driven from the motor 27 by means of a transmission, including the belt drive 28, the belt 31 and the worm 32 in engagement with the worm gear 33 on the shaft 30 to which the pulley 34 is secured as shown in Fig. 2. The conveyor belt 29 is trained about a roller 35 on the shaft 30 and about another roller 36 at the far end of the frame F.

The shaft 30 on which the roller for this conveyor belt 29 is mounted also drives through the grooved pulley 34 by means of the belt or cord 38 another similar pulley 39 on shaft 37. This shaft carries a roller 40 for a picker belt 41, the lower portion of which travels adjacent the upper portion of the conveyor belt, Fig. 4, but in a direction opposite to the latter. The picker belt is provided over its entire length and width with a plurality of pins 42, as illustrated in Fig. 6, each of these pins having a shank 44 which is riveted at 45 to the belt, and a projecting point 47 which on the lower portion of the belt is directed against the upper surface of the conveyor 29. In the cooperation of these two belts 29 and 41 the pickers will enter the relatively soft kernels or meaty parts of the nuts so that the later will be carried in the direction of travel of the picker belt; these pins, however, will be unable to pierce the shells therefore the latter will continue their movement on the conveyor belt in the opposite direction. At the far end of the conveyor belt the shells remaining thereon and from which the kernels have been picked will be discharged over the idler roller 36.

The kernels retained by the pins of the picker belt 41 are carried along the upper stretch of that belt and are finally introduced between the teeth of a stripping device 49 pivotally mounted adjacent the idler roller 48, which is disposed longitudinally of a trough or chute 50 through which the picked parts are to be discharged. This comb or stripper, as shown in Fig. 5, is preferably made in the form of a metal plate having one of its longitudinal edges curled about a supporting rod 51 which is secured longitudinally of the delivery trough 50.

By the movement of the pins the kernels picked up by the same will first be introduced longitudinally between the gaps of the teeth 52 of this comb and in the passage of the pickers or pins 42 between the teeth; the teeth will strip the kernels from these pickers so that the kernels slide over the back of the comb into the common delivery trough 50.

In order to enhance or increase the efficiency of the machine, an additional picking element is provided in the path of the mixture carried by the conveyor belt 29. In the embodiment illustrated a roller 53 is provided with a great many radially projecting pointed pins or picking devices 54 is shown, and from Fig. 1 it is apparent that this roller 53 receives its drive from the idler roller 48 of the picker belt. For this purpose a driving belt or cord 55ª extends from a pulley 55 mounted on the shaft of the idler roller 53 and this driving cord 55ª is crossed whereby the direction of drive of the roller 53 with respect to that of the idler roller or picking belt is reversed, the roller 53 thus rotating in a direction counter to the travel of the belt 41, and in the direction of travel of the conveyor 29.

The roller 53 is shown to be provided with a plurality of radial sockets 56 in which cylindrical sleeves 57 are placed, Fig. 7. Each of these sleeves is firmly driven into the socket so as to be retained therein, and each of the sockets contains a spring 58 which acts on the head 59 of a pointed pin 54, projecting radially from the socket. Owing to the enlargement or head on this pin and owing to the provision of a flange 60 near the outer end of each sleeve, the pins cannot be completely forced out of the sockets.

This additional picking device again cooperates with a stripping device 63 whereby in the rotation of the roller 53 the softer elements, as the kernels which are picked from the material on the belt 29, are stripped from the pins 54, and after being stripped therefrom, slide downward into the chute 50 or collecting receptacle for the kernels. The stripping comb 63 used is similar to the stripping comb 49 shown in connection with the picker belt 41, in Fig. 5.

In the operation of the machine, the mixture of broken and of cracked nuts, including shells, loose meat and meat seated in the shells, is thrown into the hopper 1 and owing to the inclined bottom of the casing 2 it slides downward. During this movement, however, it is thoroughly agitated by the bars of the skeleton structure so as to enhance the sifting operation of the particles of small size which drop through the perforations in the inclined bottom to the chute from where they are delivered. The other particles are discharged on the conveyor belt 29 and are carried by the same on its upper stretch while at the same time the lower stretch of the picker belt moving in opposite direction will engage the material on the conveyor belt and will remove the soft parts from the harder parts. The material which is not picked clean by the numerous points 47 uniformly distributed over the entire length and width of the picker belt is carried by the conveyor 29 into the sphere of operation of the second picking device which is provided with sharper and longer prongs possessing picking capacities different from the pickers of the belt 41, and the material, therefore, is successively subjected to repeated treatment in the machine. The material adhering to the pointed prongs 42 and 54 of the picking devices is stripped from the same without interfering with the movement of the devices and is delivered into the chute 50 from where it may drop to a suitable collector.

I claim:

1. In a nut picking machine, a picking element provided with a plurality of picking points, means for imparting rectilinear movement in one direction to said picking element, movable means for retaining the material to be picked in operative relation to said picking element, and means for imparting to a portion of said retaining element movement in a direction opposite to that of the picking element.

2. In a nut picking machine, an endless picking belt provided with a plurality of picking points, means for driving said picking belt, a carrying belt for the material to be picked, and means for driving a portion of the carrying belt adjacent the picking belt in a direction opposite to that of the picking belt.

3. In a nut picking machine a rotating picking element, means for imparting movement thereto, a picking element having a rectilinear movement, said elements having different picking capacities, and means for stripping the picked material from the picking elements.

4. In a nut picking machine, a rotating picking element, means for imparting movement thereto, a picking element having a rectilinear movement, said elements having different picking capacities, and stationary means for stripping the picked material from the picking elements.

5. In a nut picking machine, a rotating picking element, means for imparting movement thereto, a picking element having a rectilinear movement, a discharge chute common to said picking elements and means in said discharge chute for stripping the picked material from the picking elements and for delivering it into the discharge chute.

6. In a nut picking machine, a rotating picking element comprising a plurality of spaced picking points, means for imparting movement to said element a picking element having rectilinear movement, said elements having different picking capacities, and a stripper provided with projections adapted to enter into the spaces between the picking points of the picking elements.

7. In a nut picking machine, a rotating picking element, a picking belt provided with a plurality of spaced picking points, means for imparting movement to the picking elements, a single means delivering to said picking element and picking belt, and a comb provided with teeth projecting into the spaces between said picking points and adapted to remove the picked material from said points.

8. In a nut picking machine, an endless belt picking element arranged to travel continuously in one direction, a picking element associated with the first said picking element and having picking capacities different from said first picking element and including a plurality of picking points, a common carrier for said points, and yielding means inserted between said common carrier and the picking points for normally retaining them in picking position.

9. In a nut picking machine, an endless belt picking element arranged to travel continuously in one direction, a picking element associated with the first said picking element and having picking capacities different from said first picking element and comprising a plurality of picking points, a common carrier for said points and a plurality of resilient supports individual to said picking points and mounted in said common carrier for yieldingly forcing said points into operative position.

10. In a nut picking machine, an endless belt picking element arranged to travel continuously in one direction, a roller associated with said element, and rotating in counter direction, a plurality of picking points projecting radially from the circumference of said roller, and means for yieldingly forcing said picking points into a position in which they project from the roller.

11. In a nut picking machine, an endless belt picking element arranged to travel continuously in one direction, a roller associated with said element and rotating in counter direction and provided with a plurality of sockets extending radially from the circumference of the same inward, springs mounted in said sockets and the picking points controlled by said springs and projecting radially outward of said sockets.

12. In a machine of the character described, a traveling support for the material to be picked, picking points having a rotary movement, picking points having a rectilinear movement in a direction opposed to the travel of the support, and means for maintaining a yielding relation between said picking points and material.

In testimony whereof I affix my signature at 7 S. Dearborn St., Chicago, Illinois.

FRANK A. COARI.